(12) United States Patent
Zoske et al.

(10) Patent No.: US 11,967,685 B2
(45) Date of Patent: Apr. 23, 2024

(54) BATTERY MODULE FOR AN ELECTRIC VEHICLE, AND HOLDER FOR BATTERY CELLS IN A BATTERY MODULE OF SAID TYPE

(71) Applicant: WEBASTO SE, Stockdorf (DE)

(72) Inventors: Martin Zoske, Stockdorf (DE); Volodymyr Ilchenko, Stockdorf (DE); Uwe Strecker, Stockdorf (DE); Nikolaus Gerhardt, Stockdorf (DE); Harald Bachmann, Stockdorf (DE); Jens Wieske, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 198 days.

(21) Appl. No.: 17/258,638

(22) PCT Filed: Jul. 22, 2019

(86) PCT No.: PCT/EP2019/069669
§ 371 (c)(1),
(2) Date: Jan. 7, 2021

(87) PCT Pub. No.: WO2020/016455
PCT Pub. Date: Jan. 23, 2020

(65) Prior Publication Data
US 2021/0273272 A1    Sep. 2, 2021

(30) Foreign Application Priority Data

Jul. 20, 2018  (DE) ..................... 10 2018 117 563.9

(51) Int. Cl.
*H01M 10/48* (2006.01)
*H01M 10/04* (2006.01)
(Continued)

(52) U.S. Cl.
CPC ....... *H01M 10/482* (2013.01); *H01M 10/613* (2015.04); *H01M 10/615* (2015.04);
(Continued)

(58) Field of Classification Search
None
See application file for complete search history.

(56) References Cited

U.S. PATENT DOCUMENTS 3,537,907 A * 11/1970 Wilson ................ H01M 50/227
429/120
4,849,133 A * 7/1989 Yoshida ................ H01C 7/027
252/511
(Continued)

FOREIGN PATENT DOCUMENTS

| CN | 106099253 A | 11/2016 |
|---|---|---|
| CN | 107403951 A | 11/2017 |

(Continued)

OTHER PUBLICATIONS

International Search Report and Written Opinion for International Patent Application No. PCT/EP2019/069669 dated Jan. 23, 2020, 13 pages.

(Continued)

*Primary Examiner* — Lisa S Park
(74) *Attorney, Agent, or Firm* — Haynes and Boone, LLP

(57) ABSTRACT

A battery module for an electric vehicle, includes a plurality of battery cells and at least one electrical resistance element arranged between the battery cells for heating the battery cells as needed. The electrical resistance element includes a polymer composition having a positive temperature coefficient.

11 Claims, 2 Drawing Sheets

(51) Int. Cl.
*H01M 10/613* (2014.01)
*H01M 10/615* (2014.01)
*H01M 10/625* (2014.01)
*H01M 10/637* (2014.01)
*H01M 10/6571* (2014.01)
*H01M 50/213* (2021.01)
*H01M 50/24* (2021.01)
*H01M 50/249* (2021.01)

(52) U.S. Cl.
CPC ....... *H01M 10/625* (2015.04); *H01M 10/637* (2015.04); *H01M 10/6571* (2015.04); *H01M 50/213* (2021.01); *H01M 50/24* (2021.01); *H01M 50/249* (2021.01); *H01M 10/0422* (2013.01)

(56) References Cited

U.S. PATENT DOCUMENTS

| | | | |
|---|---|---|---|
| 5,140,297 A * | 8/1992 | Jacobs | H01C 7/027 |
| | | | 219/505 |
| 5,817,423 A | 10/1998 | Kajimaru et al. | |
| 6,498,406 B1 * | 12/2002 | Horiuchi | H01M 10/613 |
| | | | 429/120 |
| 2009/0123819 A1 * | 5/2009 | Kim | F28D 15/0275 |
| | | | 429/120 |
| 2010/0316821 A1 | 12/2010 | Chang et al. | |
| 2017/0162839 A1 * | 6/2017 | Botadra | H01M 50/20 |
| 2017/0338534 A1 * | 11/2017 | Sutherland | H01M 10/623 |

FOREIGN PATENT DOCUMENTS

| | | |
|---|---|---|
| CN | 108288739 A | 7/2018 |
| DE | 10 2017 111 130 A1 | 11/2017 |
| EP | 2398108 A1 | 12/2011 |
| GB | 2549512 A | 10/2017 |
| JP | 2011040330 A | 2/2011 |
| WO | WO 2009124222 A2 | 10/2009 |
| WO | WO 2012101954 A1 | 8/2012 |

OTHER PUBLICATIONS

Office Action for Chinese Patent Application No. 201980048188.8 dated Oct. 18, 2023; 9 pages.

* cited by examiner

BATTERY MODULE FOR AN ELECTRIC VEHICLE, AND HOLDER FOR BATTERY CELLS IN A BATTERY MODULE OF SAID TYPE

CROSS REFERENCE TO RELATED APPLICATIONS

This application is a national stage of International Application No. PCT/EP2019/069669 filed Jul. 22, 2019, which claims priority from German Patent Application 10 2018 117 563.9 filed Jul. 20, 2018 in the German Patent and Trademark Office, the disclosures of which are incorporated herein by reference in their entirety.

BACKGROUND

Technical Area

The present invention relates to a battery module for constructing a traction battery for an electric vehicle, for example a passenger vehicle or utility vehicle, and a holder for battery cells in such a battery module.

Related Art

An electric vehicle is understood in the present case as an electrically driven vehicle, in particular a solely electrically driven vehicle or a hybrid vehicle. Such vehicles are equipped with an electrical energy accumulator in the form of a battery, for example a traction battery or drive battery, which stores and makes available the electrical energy required for the driving operation. The batteries are also referred to as rechargeable batteries. These are generally electrochemical rechargeable batteries, in particular lithium-ion rechargeable batteries.

Such batteries are typically not constructed as a monoblock, but rather modularly from a large number of battery cells which are electrically connected to one another. Arranging battery cells in battery modules and assembling these modules to form a battery is accordingly known for the construction of a battery system in an electric vehicle. This increases the configurability of battery systems and enables the use of comparatively more cost-effective standard battery cells. Such battery systems can furthermore comprise a housing accommodating the battery modules, electrical wiring, and a battery management system.

In terms of the present disclosure, a battery cell is understood as an electrochemical storage cell, for example a secondary cell. The term "cell" can be understood with regard to the physical appearance of the component as the smallest structural unit which can be contacted. In contrast, a battery module is understood as a structural unit which combines a large number of battery cells. Accordingly, a battery or battery system is understood as a structural unit which is constructed from one or more interconnected battery modules. The battery or the battery system is generally provided for use in an electric vehicle but can also be used in other vehicles or other areas of application.

The power and the capacity of a battery which can be withdrawn, in particular of a lithium-ion rechargeable battery, are temperature dependent and accordingly can only be optimally operated in a specific temperature range, for example in a temperature range between 20° and 60° C. If battery cells have a temperature outside the optimum temperature range, this can result in a reduction of the performance and even damage to the battery cells.

Known battery systems are accordingly equipped with a temperature control system, which is designed to cool the battery cells at temperatures above the optimum temperature range and heat them at temperatures below the optimum temperature range. Such a temperature control system is disclosed, for example in GB 2549512 A.

Furthermore, providing an electrical heating system having a temperature control circuit extending through the battery and along the battery cells, through which a heatable temperature control medium flows, is known for heating the battery cells. The temperature control medium is typically preheated outside the battery by means of the electrical heating system and conducted through flow ducts provided in the battery. The heating of the battery using such a heating system can take place with a time delay and non-uniformly, however. Due to the provision of the temperature control circuit, such a heating system furthermore has effects on the total weight of the battery system and can represent a safety risk for the battery system due to leaks.

SUMMARY

An improved battery module for an electric vehicle and a holder for battery cells in such a battery module, which provide a heat-flow-optimized design and a compact construction of the battery module is described herein according to various embodiments.

Accordingly, a battery module for an electric vehicle is proposed, which includes a plurality of battery cells and at least one electrical resistance element arranged between the battery cells for heating the battery cells as needed. The battery module is distinguished in that the electrical resistance element has a polymer composition having a positive temperature coefficient.

In the proposed battery module, the at least one electrical resistance element is used as an electrical heating element, which converts electrical energy into heat for heating the battery cells. For this purpose, current can generally be applied to the electrical resistance element. In other words, upon a current flowing through the electrical resistance element, heat is induced therein, which results in a rise of the temperature of the battery cells in thermally-conductive connection thereto. Accordingly, the electrical resistance element can be connected to a power source for heating the battery cells as needed and can be designed to convert electrical energy provided by the power source into heat.

In relation to known heating systems for heating battery cells, in which a temperature control medium circulates in a temperature control circuit through the battery, within the proposed battery module, a temperature control circuit can be omitted. Accordingly, the battery module can have a compact construction and can be less susceptible to interference or fault.

The use of the electrical resistance element furthermore has the effect that it can be arranged in a space-saving manner and with a high level of design freedom in the battery module, whereby rapid and uniform heating of battery cells can be ensured in comparison to the known heating systems.

In order to provide a current flow through the electrical resistance element, opposing ends of the electrical resistance element can be provided with electrical terminals for the electrically conductive connection of the electrical resistance element to a power source, in particular to its poles. More precisely, the electrical terminals arranged at the opposing ends of the electrical resistance element can each be connected to a different pole of the power source. In this way, the electrical resistance element can be connected in a circuit and can convert the current flowing through the circuit into heat. In a further configuration, the battery cells of the battery module can be used as the power source for the electrical resistance element. Accordingly, the electrical terminals of the electrical resistance element can be connected in an electrically conductive manner to the battery cells. The battery cells can especially be interconnected and thus form a battery, wherein the electrical terminals of the electrical resistance element can each be electrically conductively connected to one pole of the battery formed by the battery cells.

As described above, the electrical resistance element includes a polymer composition having a positive temperature coefficient. In particular, the electrical resistance element can consist of the polymer composition.

Material compositions having a positive temperature coefficient are generally also referred to as PTC (positive temperature coefficient) compositions. Such compositions have the property of conducting electrical current better at low temperatures than at high temperatures. In other words, an electrical resistance of the composition increases with increasing temperature. Components formed from a PTC composition are accordingly also referred to as cold conductors.

In the proposed electrical resistance element, the polymer composition having a positive temperature coefficient is used. This composition corresponds to a PTC material composition based on polymer and is also referred to as a PPTC (polymeric positive temperature coefficient) composition. An electrical resistance element based on a PPTC composition has a nonlinear resistance curve. In other words, the electrical resistance of this material does not increase linearly with rising temperature.

As current flows through the electrical resistance element, heat is generated therein, which leads to an increase of the temperature and the resistance of the electrical resistance element. As the electrical resistance increases, the amperage of the current flowing through the electrical resistance element decreases at the same time while the voltage remains constant. Since the induced heat in the electrical resistor is proportional to the square of the amperage, the induced heat accordingly decreases with increasing temperature of the electrical resistance element.

The use of a PPTC composition thus has the effect that with rising temperature of the material, an introduction of heat into the electrical resistance element induced by the current flow is throttled. Since the electrical resistance of this material increases non-linearly with rising temperature, an electrical resistance element formed from a PPTC composition enables rapid heating to a specified nominal temperature and, after reaching the nominal temperature, in turn a rapid or abrupt throttling of the induced heat, in order to avoid overheating of the electrical resistance element. For example, the PPTC composition can be selected in such a way that the electrical resistance element is not heated beyond the optimum temperature range of the battery cells in operation, in particular upon application of a current. For example, the optimum temperature range can be between 20° C. and 60° C. The PPTC composition of the electrical resistance element can be provided in such a way that upon reaching the specified nominal temperature, the electrical resistance element is transferred into a high-resistance state. The introduction of heat induced via the electrical resistance element can thus be strongly reduced, so that upon reaching the nominal temperature, the electrical resistance element is not heated further by the application of current.

The PPTC composition of the electrical resistance element includes at least one polymer. The polymer typically forms a nonconductive polymer matrix in the PPTC composition, in which electrically conductive particles are embedded or dispersed. In this way, an electrical conductivity of the PPTC composition can be ensured, in particular below the nominal temperature. In addition, thermally conductive particles can be embedded or dispersed in the polymer matrix, which improve a thermal conductivity of the polymer composition.

As the PPTC composition is based on a polymer matrix, the electrical resistance element formed therefrom has advantageous mechanical and thermal properties for use in the area of electric vehicles. In particular in relation to PTC compositions based on ceramic, a PPTC composition has a higher thermal conductivity, a lower specific weight, and a higher strength with respect to oscillations occurring in operation of an electric vehicle.

More precisely, the PPTC composition can, for example, include at least one polymer from the group including: polyethylene, polyethylene oxide, polybutadiene, polyethylene acrylate, ethylene-ethyl acrylate copolymers, ethylene acrylic acid copolymers, polyesters, polyamides, polyethers, polycaprolactam, fluorinated ethylene-propylene copolymers, chlorinated polyethylene, sulfochlorinated polyethylene, ethyl vinyl acetate copolymers, polypropylene, polystyrene, styrene-acrylonitrile copolymers, polyvinyl chloride, polycarbonates, polyacetals, polyalkylene oxides, polyphenylene oxide, polysulfones, and fluorinated plastics. For example, the PPTC composition can include two or more polymers from the preceding group. The type of the polymers and the composition ratios can be varied at the same time.

The electrically conductive particles included in the PPTC composition can include at least one type of particles from the group including: carbon black, silver powder, gold powder, carbon powder, graphite powder, copper powder, carbon fibers, nickel powder, and silver-coated fine particles. For example, the electrically conductive particles included in the PPTC composition can include multiple types of particles from the above-mentioned group. At the same time, the type of the electrically conductive particles and/or their particle size can be varied. For example, the electrically conductive particles can have a particle size between 1 µm and 200 µm.

The thermally conductive particles included in the PPTC composition can include at least one type of particles from the group including: silicon carbide, silicon nitride, beryllium oxide, selenium, and aluminum oxide. For example, the thermally conductive particles included in the PPTC composition can include multiple types of particles from the above-mentioned group. At the same time, the type of the thermally conductive particles and/or their particle size can be varied. For example, the thermally conductive particles can have a particle size between 1 µm and 200 µm.

A high level of design freedom for the heating element within the battery module is provided by the use of the PPTC composition for the electrical resistance element. This can in particular be attributed to the fact that a component consisting of the PPTC composition can be produced comparatively easily and in any shape. For example, such components can be manufactured cost-effectively in high piece counts by means of extrusion or an injection molding method, which can be an advantage in particular for use in battery modules for electric vehicles.

The high level of design freedom in the use of the PPTC composition furthermore enables a heat-flow-optimized design of the electrical resistance elements and their deliberate arrangement within the battery module. In this way, a deliberate heating of specific subregions within the battery module may also be achieved.

To ensure a heat-flow-optimized design of the battery module, the electrical resistance element provided in the battery module can be provided in such a way that it abuts on at least one battery cell. In other words, the electrical resistance element can be in contact with at least one battery cell. The electrical resistance element generally abuts on an outer surface, in particular a lateral surface of the battery cell. For example, the electrical resistance element can abut on multiple, for example two or four, electrical resistance elements.

If the battery module includes multiple electrical resistance elements, each of the multiple resistance elements can abut on at least one battery cell. In this case, the battery cells can each be in contact with different electrical resistance elements. For example, each of the multiple resistance elements can abut on two or four electrical resistance elements.

The battery cells can be provided in the form of round cells, prismatic battery cells, in particular flat cells, and/or so-called pouch cells. In a further configuration, the at least one electrical resistance element can have an outer surface, in particular a lateral surface, which is complementary to an outer surface, in particular a lateral surface, of the battery cell abutting on it. For example, the battery cells can be provided as round cells and can have a cylindrical shape. Accordingly, the electrical resistance element can have an outer surface, in particular a lateral surface, which can be concave and in particular complementary to the cylindrical shape of the battery cell at least in sections. For example, the outer surface, in particular the lateral surface, of the electrical resistance element can have multiple, in particular two or four, concave sections. The concave sections can be in contact with the outer surface of the battery cells. The multiple concave sections of the electrical resistance element can in particular have a different alignment or orientation. In other words, a surface normal of the outer surface forming the concave sections is different for the different concave sections and in particular points in various directions.

Alternatively or additionally, the at least one electrical resistance element can have a length which essentially corresponds to a length or height of the battery cells, in particular the battery cell abutting on it. Alternatively, a length of the electrical resistance element can be greater or less than a length or height of the battery cell.

In a further configuration, the at least one electrical resistance element can produce or form a holder or carrier structure for the battery cells. In other words, the at least one electrical resistance element can be designed to bear or support at least one battery cell within the battery module. In particular, the at least one electrical resistance element can be designed to bear or support the plurality of battery cells within the battery module.

For example, the at least one electrical resistance element can form multiple receiving compartments or receiving cells for the battery cells, in which the battery cells can be embedded and can be fixedly connected to the holder or carrier structure formed by the electrical resistance element. The receiving compartments or receiving cells can be formed open. In other words, the receiving compartments or receiving cells can have at least one, typically two opposing openings, via which the battery cells can be introduced into and/or removed from the receiving compartments or receiving cells. The receiving compartments are generally designed in such a way that the battery cells are inserted lengthwise or height-wise into the receiving compartments. A cross section of the receiving compartments or receiving cells can be formed complementary at least in sections to a cross section of the battery cells. Accordingly, an inner surface of the receiving compartments, which forms an outer surface of the electrical resistance element, can abut at least in sections on an outer surface, in particular a lateral surface, of the battery cells and in particular can be formed complementary thereto.

Furthermore, the at least one electrical resistance element can be provided in such a way that multiple receiving compartments or receiving cells are arranged in a regular pattern adjacent to one another and/or in parallel to one another. The at least one electrical resistance element can form side walls of the carrier structure forming the multiple receiving compartments or receiving cells. For example, the multiple receiving compartments or receiving cells can form a honeycomb structure. Alternatively, the side walls formed by the at least one electrical resistance element can be arranged in a grid, so that the multiple receiving compartments or receiving cells are arranged adjacent to one another in a first direction and optionally are furthermore arranged adjacent to one another in a second direction different from the first direction, in particular perpendicular thereto.

In a further configuration, the electrical resistance element can be provided with at least one cooling duct, through which a temperature control medium can flow to cool the battery cells. In this way, a compact construction of the battery module can be provided, in which, in addition to a heating element for heating the battery cells, furthermore a cooling device for cooling the battery cells is implemented. The electrical resistance element can form the cooling ducts at least in sections, through which a temperature control medium provided by the cooling system can flow.

As a result, the hereby proposed design of the electrical resistance element enables an implementation of multiple functions within the battery module. In addition to the function as a heating element for the battery cells, the at least one electrical resistance element can furthermore be used as a carrier structure for supporting the battery cells within the battery module and/or, by being able to form a cooling duct through which a temperature control medium can flow, as a cooling element for cooling the battery cells. In this way, the proposed electrical resistance element contributes to reducing components of the battery module and provides a compact, weight-reduced, and easy-to-manufacture construction of the battery module.

A holder for a plurality of battery cells of a battery module is also described herein according to various embodiments. The holder can be used in particular in the above-described battery module. The features described above in conjunction with the battery module are thus also accordingly considered to be disclosed for the holder.

Accordingly, a holder is provided for a plurality of battery cells of a battery module, which includes at least one electrical resistance element to be arranged between the battery cells for heating the battery cells as needed. The electrical resistance element is characterized by the fact that it includes a polymer composition having a positive temperature coefficient.

In one further configuration, the at least one electrical resistance element can produce or form a carrier structure for the battery cells, which bears or supports the battery cells within the battery module. Alternatively or additionally, the at least one electrical resistance element can form multiple open receiving compartments or receiving cells, which are designed to accommodate and/or hold the battery cells in the battery module.

BRIEF DESCRIPTION OF THE FIGURES

Further embodiments of the invention are explained in greater detail by the following description of the figures.

DETAILED DESCRIPTION

Exemplary embodiments are described hereinafter on the basis of the figures. Identical, similarly, or identically-acting elements are provided in the different figures with identical reference signs, and a repeated description of these elements is partially omitted to avoid redundancies.

Figure 1:
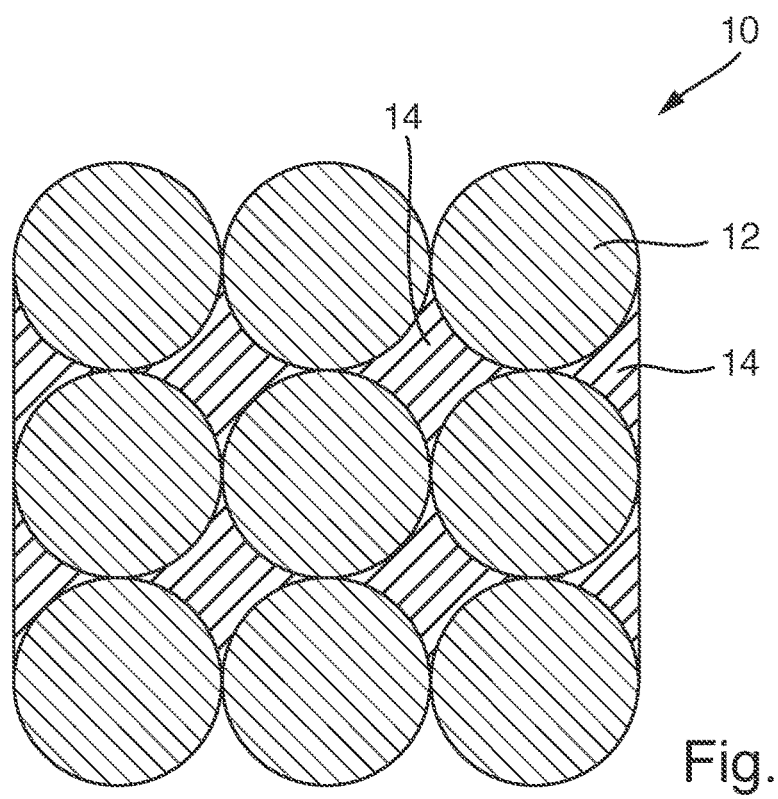
FIG. 1 schematically shows a cross-sectional view of a battery module of a first embodiment.

FIG. 1 shows a cross-sectional view of a battery module 10 for an electric vehicle. The battery module 10 includes a plurality of battery cells 12, which are provided in the form of round cells having a cylindrical shape. The battery cells 12 are arranged inside the battery module 10 adjacent to one another and in parallel to one another with respect to a longitudinal direction of the battery cells 12. Furthermore, the battery cells 12 are electrically interconnected and are held in a housing (not shown here) by a holder or carrier structure (also not shown here).

The battery module 10 furthermore includes multiple electrical resistance elements 14 arranged between the battery cells 12, which are designed for heating the battery cells 12 as needed. The electrical resistance elements 14 include a polymer composition having a positive temperature coefficient, also referred to hereinafter as a PPTC composition.

Figure 2:
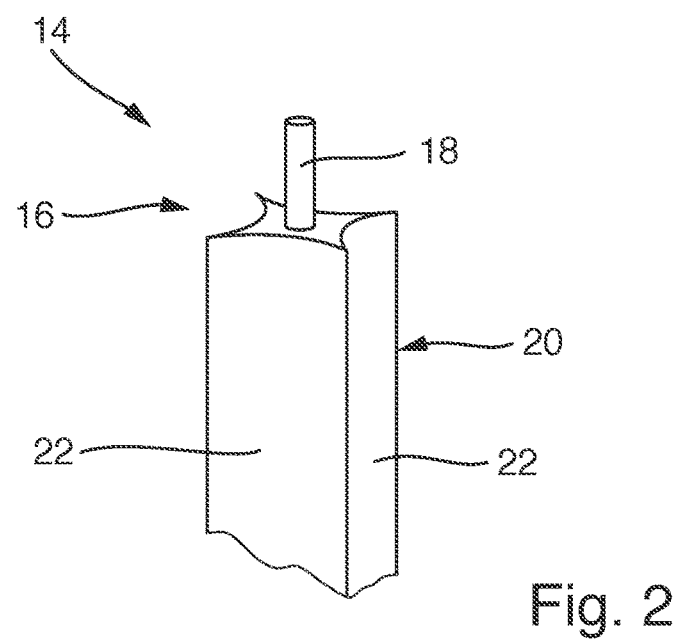
FIG. 2 schematically shows a perspective view of an electrical resistance element of the battery module shown in FIG. 1.

Current can be applied to the electrical resistance elements 14 to heat the battery cells 12 as needed and they are designed to convert the electrical energy provided to the electrical resistance elements 14 in this way into heat. In other words, as a current flows through the electrical resistance elements 14, heat is induced therein, which causes a rise of the temperature of the battery cells 12 in thermally-conductive connection thereto. For this purpose, the electrical resistance elements 14 are connected to a power source (not shown here) and are designed to convert the electrical energy provided by the power source into heat. As shown in FIG. 2, the electrical resistance elements 14 includes electrical terminals 18 at their opposing ends 16 for the electrically conductive connection of the electrical resistance elements 14 to the power source, in particular the respective poles of the power source.

The PPTC composition of the electrical resistance elements 14 includes at least one polymer which forms a nonconductive polymer matrix, in which electrically conductive particles and thermally conductive particles are dispersed. More precisely, the PPTC composition can include, for example, at least one polymer from the group including: polyethylene, polyethylene oxide, polybutadiene, polyethylene acrylate, ethylene-ethyl acrylate copolymers, ethylene acrylic acid copolymers, polyesters, polyamides, polyethers, polycaprolactam, fluorinated ethylene-propylene copolymers, chlorinated polyethylene, sulfochlorinated polyethylene, ethyl vinyl acetate copolymers, polypropylene, polystyrene, styrene-acrylonitrile copolymers, polyvinyl chloride, polycarbonates, polyacetals, polyalkylene oxides, polyphenylene oxide, polysulfones, and fluorinated plastics. The electrically conductive particles dispersed in the PPTC composition can include at least one type of particles from the group including: carbon black, silver powder, gold powder, carbon powder, graphite powder, copper powder, carbon fibers, nickel powder, and silver-coated fine particles. Furthermore, the thermally conductive particles included in the PPTC composition can include at least one type of particles from the group including: silicon carbide, silicon nitride, beryllium oxide, selenium, and aluminum oxide.

As shown in FIG. 1, the multiple electrical resistance elements 14 include two types of electrical resistance elements having a different geometric design. A first type of the electrical resistance elements 14, as shown in FIG. 2, is designed to abut on four battery cells 12 inside the battery module 10. In contrast, a second type of the electrical resistance elements 14 is designed to abut on two battery cells 12 inside the battery module 10 and is accordingly arranged in an edge region of the battery module 10 shown in FIG. 1.

More precisely, the electrical resistance elements 14 are provided in such a way that they have a lateral surface 20, which is formed complementary to a lateral surface of the respective battery cells 12 abutting on it. The electrical resistance elements 14 of the first type have a lateral surface 20 having four concave sections 22 of a different alignment or orientation. In contrast, the electrical resistance elements 14 of the second type have a lateral surface 20 having two concave sections 22 of a different alignment or orientation. The concave sections 22 are formed complementary to the lateral surface of the respective battery cell 12 abutting on it. Furthermore, the electrical resistance elements 14 have a length which essentially corresponds to a length or height of the battery cells 12. In other words, the electrical resistance elements 14 extend along the longitudinal direction of the battery cells 12 over the entire length or height thereof. Alternatively, the electrical resistance elements 14 can have a length which is greater or less than the length or height of the battery cells 12.

Figure 3:
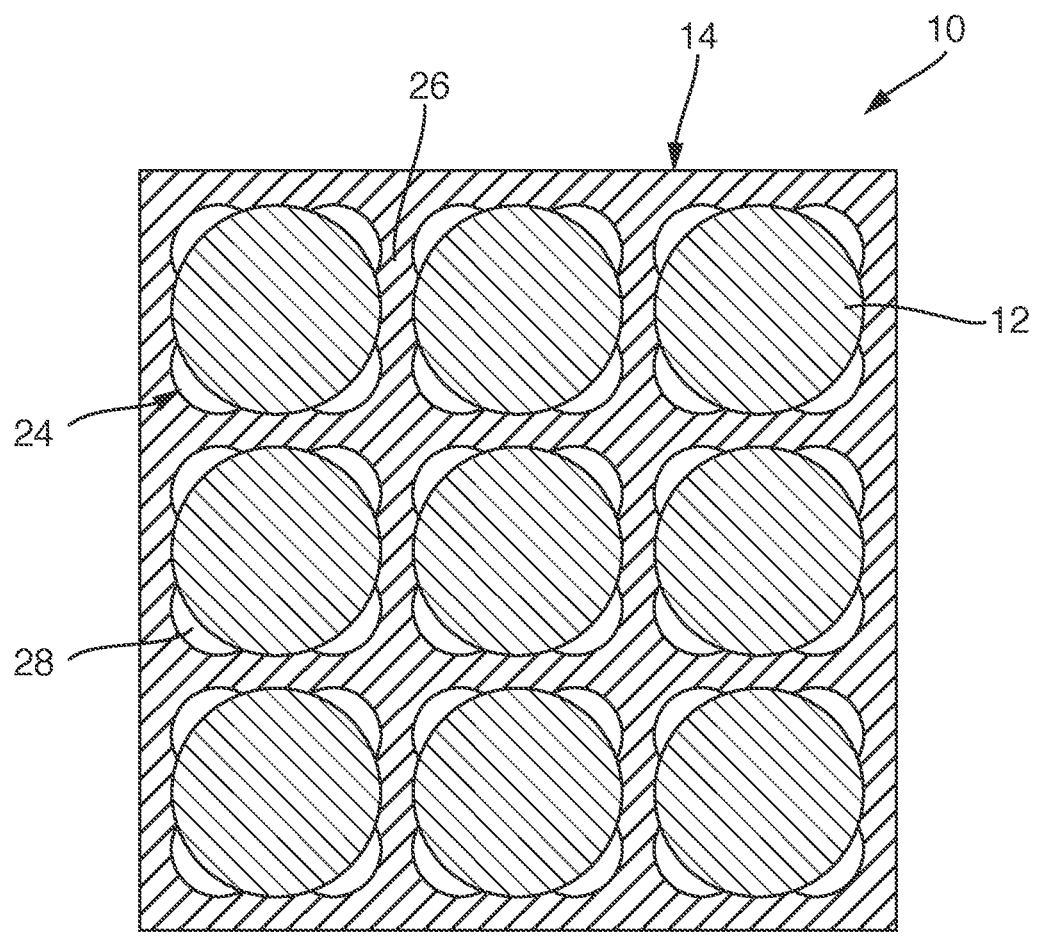
FIG. 3 schematically shows a cross-sectional view of a battery module of a second embodiment.

FIG. 3 shows a second embodiment of a battery module 10 for an electric vehicle. In contrast to the design shown in FIG. 1, the battery module 10 of the second embodiment includes an electrical resistance element 14 which forms a holder or carrier structure for the battery cells 12. In other words, the electrical resistance element 14 shown in FIG. 3 is designed to bear or support the battery cells 12 inside the battery module 10.

More precisely, the electrical resistance element 14 is provided in such a way that it forms multiple open receiving compartments 24, in each of which a battery cell 12 is embedded and fixed. The battery cells 12 accommodated in the receiving compartments 24 are thus fixedly connected to the holder or carrier structure formed by the electrical resistance element 14. The receptacle compartments 24 are provided in such a way that the battery cells 12 are inserted therein lengthwise.

In particular, the electrical resistance element 14 forms side walls 26 of the receiving compartments 24. Outer surfaces of the electrical resistance element 14 form inner surfaces of the receiving compartments 24. The side walls 26 are formed in such a way that the inner surface of the receiving compartments 24 abuts in sections on the lateral surface of the battery cells 12 held therein and is formed complementary thereto. Furthermore, recesses 28 are provided between the side walls 26 and the battery cells 12 accommodated in the receiving compartments 24. In the embodiment shown here, the side walls 26 are arranged in a grid, so that a regular pattern of receiving compartments 24 arranged adjacent to one another and one over another is provided.

Furthermore, the electrical resistance element 14 can be provided with at least one cooling duct, through which a temperature control medium can flow to cool the battery cells.

If applicable, all individual features which are shown in the exemplary embodiments can be combined and/or exchanged with one another without leaving the scope of the invention.

The invention claimed is:

1. A battery module for an electric vehicle, comprising:
   a plurality of battery cells; and
   an electrical resistance element arranged between the plurality of battery cells and configured to heat the plurality of battery cells, wherein:
   the electrical resistance element is rod-shaped and comprises 1) a polymer composition having a positive temperature coefficient and 2) an outer surface having four concave sections having surface normal vectors, each surface normal vector pointing in a different direction,
   the electrical resistance element contacts an outer surface of at least two battery cells from the plurality of battery cells;
   a length of the electrical resistance element is greater than a length or a height of the at least two battery cells, and
   the plurality of battery cells each comprise a cylindrical shape.

2. The battery module of claim 1, wherein the electrical resistance element is connected to a power source and is configured to convert electrical energy into heat.

3. The battery module of claim 2, wherein the electrical resistance element comprises electrical terminals disposed on opposing ends of the electrical resistance element, and the electrical terminals are configured to provide an electrically conductive connection of the electrical resistance element to the power source.

4. The battery module of claim 1, wherein the polymer composition comprises:
   at least one polymer selected from polyethylene, polyethylene oxide, polybutadiene, polyethylene acrylate, ethylene-ethyl acrylate copolymers, ethylene acrylic acid copolymers, polyesters, polyamides, polyethers, polycaprolactam, fluorinated ethylene-propylene copolymers, chlorinated polyethylene, sulfochlorinated polyethylene, ethyl vinyl acetate copolymers, polypropylene, polystyrene, styrene-acrylonitrile copolymers, polyvinyl chloride, polycarbonates, polyacetals, polyalkylene oxides, polyphenylene oxide, polysulfones, or fluorinated plastics;
   electrically conductive particles selected from carbon black, silver powder, gold powder, carbon powder, graphite powder, copper powder, carbon fibers, nickel powder, or silver-coated fine particles; and/or
   thermally conductive particles selected from silicon carbide, silicon nitride, beryllium oxide, selenium, or aluminum oxide.

5. The battery module of claim 1, wherein the electrical resistance element contacts an outer surface of four battery cells from the plurality of battery cells.

6. The battery module of claim 1, wherein the electrical resistance element comprises an outer surface that is complementary to an outer surface of the at least two battery cells.

7. The battery module of claim 6, wherein the outer surface of the electrical resistance element comprises a lateral surface, and the outer surface of the at least two battery cells comprises a lateral surface.

8. The battery module of claim 1, wherein the electrical resistance element forms a holder for the plurality of battery cells, and the holder is configured to carry the plurality of battery cells inside the battery module.

9. The battery module of claim 8, wherein the holder comprises multiple open receiving compartments for the plurality of battery cells, and the plurality of battery cells are embedded in the multiple open receiving compartments.

10. The battery module of claim 9, wherein:
    the multiple open receiving compartments comprise side walls,
    an inner surface of the multiple open receiving compartments abuts on a battery cell accommodated therein from the plurality of battery cells, and
    the inner surface is formed complementary to an outer surface of the battery cell.

11. The battery module of claim 1, wherein the electrical resistance element comprises at least one cooling duct, and the at least one cooling duct is configured to facilitate a flow of a temperature control medium therethrough and cool the plurality of battery cells.

* * * * *